UNITED STATES PATENT OFFICE.

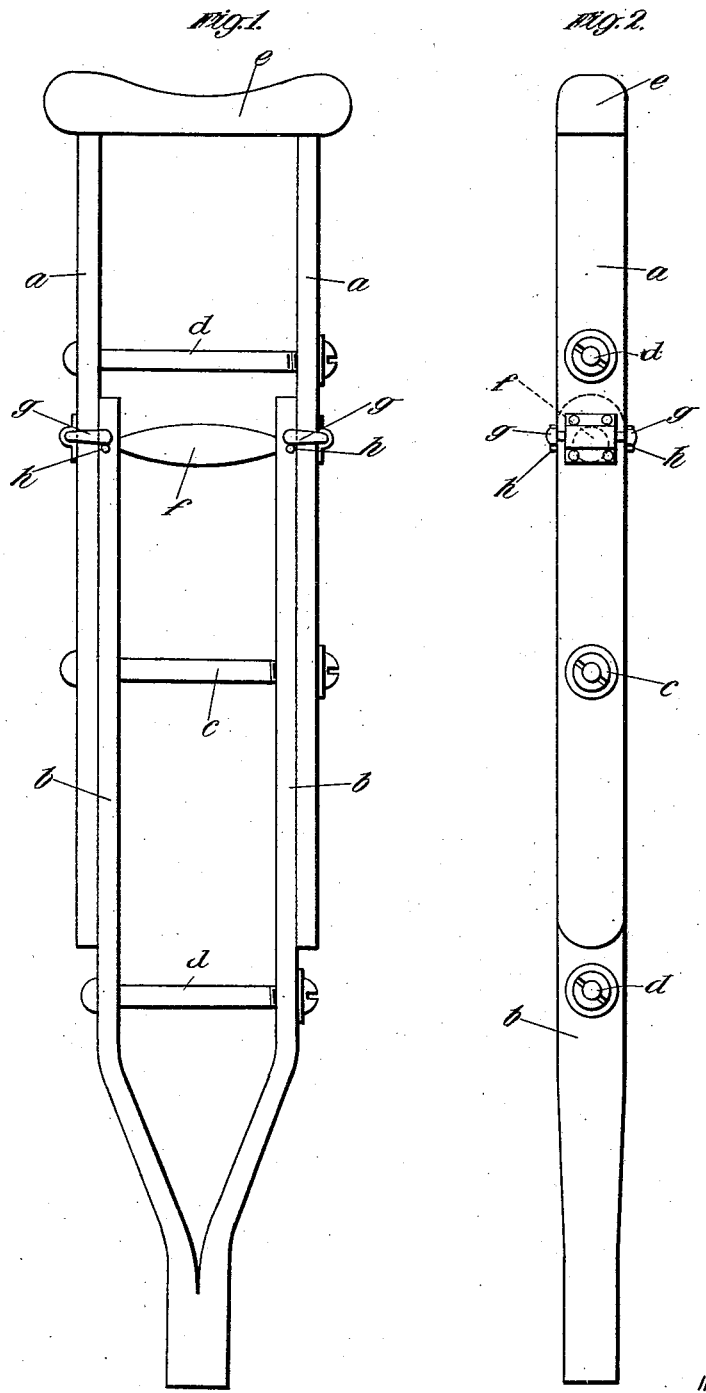

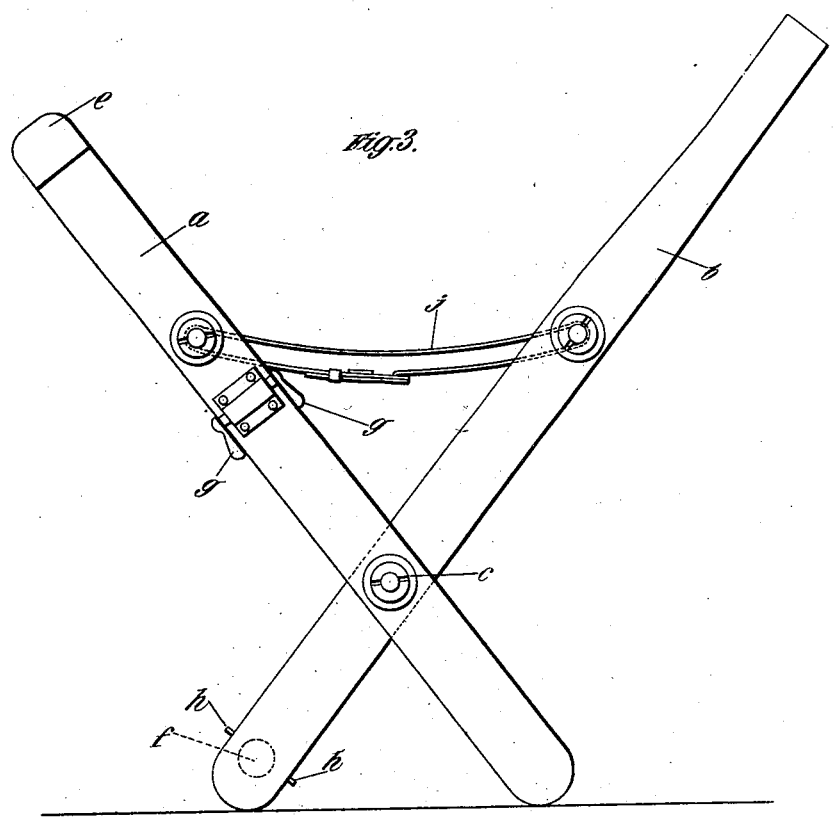

JAMES PETER PLUMB, OF WOOD GREEN, LONDON, ENGLAND.

CRUTCH.

1,269,504.  Specification of Letters Patent.  Patented June 11, 1918.

Application filed June 27, 1917. Serial No. 177,224.

*To all whom it may concern:*

Be it known that I, JAMES PETER PLUMB, a subject of the King of Great Britain, and resident of 7 Bedford road, Wood Green, London, England, have invented a certain new and useful Improvement in Crutches, of which the following is a specification.

This invention relates to crutches and has for its object to provide an improved crutch which may be very readily converted into a seat in order that the user may rest.

To this end a crutch constructed in accordance with this invention comprises two pivotally-connected parts adapted to be rigidly secured in extended position to constitute a crutch and also adapted to be moved about the pivotal axis and to have attached thereto a strip of webbing or the like to constitute a seat whereof said parts constitute the legs.

Referring to the accompanying drawings, Figure 1 is a face view of one form of crutch constructed according to the present invention, Fig. 2 is a side elevation thereof, and Fig. 3 is a side elevation showing the device ready for use as a seat.

The crutch comprises two parts $a$ and $b$ pivoted on a cross bolt $c$, the lateral members of the part $a$ lying outside and alongside those of the part $b$. The members of each part are braced by cross bolts $d$ and the part $a$ is formed with the usual arm support $e$, while the part $b$ carries the usual hand grip $f$. In order that the two parts may be maintained in their relative positions when the device is in use as a crutch, the lateral members of the part $a$ carry a pair of pivotally-mounted U-shaped clips $g$, $g$ near the upper ends thereof, said clips being adapted to be swung into position to engage the edges of the lateral members of the part $b$ and prevent movement about the bolt $c$ in either direction, the movement of the clips $g$, $g$ being limited by stop pins $h$, $h$ on the lateral members of the part $b$.

When it is desired to use the crutch as a seat the clips $g$, $g$ are swung clear of the lateral members of the part $b$, and the two parts are then turned about the bolt $c$ and connected together by a strap of webbing or the like $j$ passed around the bolts $d$, $d$, as shown in Fig. 3, which shows the crutch converted into a seat.

I claim:—

1. A crutch, comprising two pivotally connected members, one having an arm rest, the members being adapted to be locked together with a portion of each projecting beyond the other to form a crutch, and to be swung about their pivot and connected by a piece of flexible material to form a seat.

2. A crutch, comprising two pivotally connected sections, each having two members, the sections having at their upper ends an arm rest and a hand grip respectively, the sections being adapted to be locked together in lapped engagement with a portion of each projecting beyond the other to form a crutch, and to be swung on their pivot and connected by a piece of flexible material to form a seat.

3. A combined crutch and seat consisting of two sections, each having two parallel members, the sections having at their upper ends an arm rest, and a hand grip, respectively, bolts connecting the members of the sections, a pivot connecting the sections, means for locking the sections in extended position and lapped engagement, whereby to form a crutch, and a piece of flexible material adapted to be secured to the bolts of the sections to form a seat, when the sections are swung upon their pivot.

JAMES PETER PLUMB.

Copies of this patent may be obtained for five cents each, by addressing the "Commissioner of Patents, Washington, D. C."